(12) United States Patent
Salomon et al.

(10) Patent No.: US 8,052,147 B2
(45) Date of Patent: Nov. 8, 2011

(54) INSERTER SYSTEM DIVERT GATE ACTUATED BY PRE-FOLD ACCUMULATOR DRIVE SHAFT

(75) Inventors: James A. Salomon, Cheshire, CT (US); Norman R. Lilly, Monroe, CT (US); Aaron D. Smith, Beacon Falls, CT (US)

(73) Assignee: Pitney Bowes Inc., Stamford, CT (US)

( * ) Notice: Subject to any disclaimer, the term of this patent is extended or adjusted under 35 U.S.C. 154(b) by 32 days.

(21) Appl. No.: 12/636,548

(22) Filed: Dec. 11, 2009

(65) Prior Publication Data

US 2011/0140349 A1   Jun. 16, 2011

(51) Int. Cl.
*B65H 39/10* (2006.01)
(52) U.S. Cl. ............... 271/303; 271/301; 271/304
(58) Field of Classification Search ............... 271/303, 271/301, 302, 304
See application file for complete search history.

(56) References Cited

U.S. PATENT DOCUMENTS

| | | | | |
|---|---|---|---|---|
| 4,500,002 A * | 2/1985 | Koshio et al. | | 209/534 |
| 4,506,882 A * | 3/1985 | Ito et al. | | 271/303 |
| 5,028,046 A * | 7/1991 | Kuwahara | | 271/301 |
| 5,732,609 A * | 3/1998 | Marschke | | 83/92.1 |
| 6,131,902 A * | 10/2000 | Takenaka et al. | | 271/303 |
| 6,176,485 B1 * | 1/2001 | Wingate | | 271/303 |
| 7,134,654 B2 * | 11/2006 | Yamada et al. | | 270/58.08 |
| 2005/0179198 A1 * | 8/2005 | Biegelsen et al. | | 271/303 |
| 2008/0001350 A1 * | 1/2008 | Okamoto et al. | | 271/303 |

FOREIGN PATENT DOCUMENTS

JP            04064567 A  *  2/1992
* cited by examiner

*Primary Examiner* — Kaitlin Joerger
*Assistant Examiner* — Prasad Gokhale
(74) *Attorney, Agent, or Firm* — Brian A. Collins; Charles R. Malandra, Jr.; Steven J. Shapiro

(57) ABSTRACT

An inserter system includes a pre-fold accumulator subsystem in which plural sheets are collected before folding and insertion into an envelope. A divert gate is at the upstream side of the pre-fold accumulator to selectively downwardly divert sheets fed in a reverse direction from the pre-fold accumulator. Positioning of the divert gate is controlled by a mechanism that couples the divert gate and a drive shaft that drives a sheet drive belt component of the pre-fold accumulator.

5 Claims, 4 Drawing Sheets

INSERTER SYSTEM DIVERT GATE ACTUATED BY PRE-FOLD ACCUMULATOR DRIVE SHAFT

FIELD OF THE INVENTION

The invention disclosed herein relates generally to paper handling equipment, and more particularly to a folder and inserter system for assembling mail pieces.

BACKGROUND

FIG. 1 is a front elevational view of a conventional inserter system 100. As seen from FIG. 1, the inserter system 100 includes a control panel 102, and several sheet feeder towers 104 arranged along a sheet transport path 106. Each sheet feeder tower 104 may, for example, include two or more sheet feeders that hold and contain feed trays for paper sheets and inserts. The sheets are fed from the sheet feeders along the sheet transport path to a pre-fold accumulator 108. In the case of at least some mail pieces to be assembled by the inserter system 100, two or more sheets are accumulated to form a collation, which is then fed downstream to a folder 110.

The inserter system 100 also includes an envelope feeder 112. Envelopes are fed from the envelope feeder 112 to an insertion station 114, at which each folded collation is inserted into a respective one of the envelopes. Sealing and metering of the resulting mail pieces may be performed downstream from the inserter system 100, in a mailing machine which is not shown.

FIGS. 2A and 2B schematically illustrate operation of a divert gate 202 positioned upstream from the pre-fold accumulator 108. Also schematically shown in FIGS. 2A and 2B is a sheet transport mechanism 203 that transports paper sheets in a downstream direction (indicated by arrow 204 in FIG. 2A) to the pre-fold accumulator 108. The pre-fold accumulator 108 includes one or more drive belts (discussed further below, not separately shown in FIGS. 2A and 2B) which drive the sheets toward a pre-fold accumulator gate (not separately shown). Until the collation of sheets is complete, the pre-fold accumulator gate blocks the sheets so that they are held in the pre-fold accumulator 108.

On occasion, a collation is too large to be folded by the folder 110. In such a case, it is necessary to outsort the collation from the fold/insertion transport path. This is accomplished in cooperation with the divert gate 202, in a manner schematically illustrated in FIG. 2B. As shown in FIG. 2B, the oversize collation (not shown) is fed in a reverse or upstream direction (indicated by arrow 206) by the drive belt(s) (not separately shown), such that the oversize collation contacts the divert gate (in its open position shown in FIG. 2B) and is diverted downwardly (as indicated by arrow 208) out of the normal feed path.

According to a previously proposed arrangement, the divert gate 202 is biased by a spring (not shown) towards the open position shown in FIG. 2B. A stop (which is not shown) limits the upward movement of the divert gate 202 to define the open position. During normal feeding of a sheet from the sheet transport mechanism 203 toward the pre-fold accumulator 108, the sheet pushes downwardly against the divert gate 202 against the force of the spring to push the divert gate 202 to its closed position (shown in FIG. 2A) to allow the sheet to be fed to the pre-fold accumulator 108. Once the sheet clears the divert gate 202, the spring pushes the divert gate 202 back to the open position shown in FIG. 2B to allow for outsorting/ diverting of the collation, if necessary.

There are potential problems with the spring-driven divert gate arrangement, as described above. For example, the spring must provide enough force to reliably return the divert gate 202 to its open position, yet not so much force that the divert gate 202 fails to close when a sheet is fed in the downstream direction over the divert gate 202 from the upstream transport. In practice, it has been difficult to arrive at a suitable amount of spring force. In some cases, the spring selected has provided too much force, and as a result, in the case of a relatively light sheet, the divert gate may fail to close upon downstream feeding of the sheet against the divert gate, resulting in the sheet crashing upwardly against the system frame (not shown) and failing to reach the pre-fold accumulator. However, if the spring force were to be reduced, the response time in opening of the divert gate may not be rapid enough for desired operation of the inserter system.

SUMMARY

According to an aspect of the invention, an inserter system includes a sheet transport mechanism for transporting a sequence of sheets in a downstream direction. The inserter system further includes a sheet accumulator subsystem, located in the downstream direction from the sheet transport mechanism. The sheet accumulator subsystem is for receiving and accumulating the sheets transported by the sheet transport mechanism. The sheet accumulator subsystem includes a drive belt and a drive shaft engaged with the drive belt at an upstream end of the drive belt. The drive shaft selectively drives the drive belt in a forward direction and a reverse direction. The drive belt is for driving one or more of the sheets in the downstream direction when the drive belt is driven in the forward direction by the drive shaft. The drive belt is also for driving one or more of the sheets in an upstream direction when the drive belt is driven in the reverse direction. The upstream direction is opposite to the downstream direction.

According to this aspect of the invention, the inserter system also includes a divert gate located in the upstream direction relative to the drive belt. The divert gate is pivotally mounted at an upstream end of the divert gate. The divert gate has a downstream end that is movable between an upper position and a lower position. The divert gate is located relative to the drive belt such that the divert gate downwardly diverts one or more of said sheets when the downstream end of the divert gate is in the upper position and the drive belt is driven in the reverse direction. The inserter system further includes a coupling mechanism for coupling the divert gate to the drive shaft to impart force from the drive shaft to the divert gate for pivotally moving the divert gate to shift the downstream end of the divert gate between the lower position and the upper position.

The coupling mechanism may include a linkage connected to the divert gate and a friction clutch carried on the drive shaft and connected to the linkage.

When the drive shaft rotates in a first rotational direction to drive the drive belt in the forward direction, the coupling mechanism couples torque from the drive shaft to the divert gate to shift the downstream end of the divert gate from the upper position to the lower position. When the drive shaft rotates in a second rotational direction (opposite to the first rotational direction), the coupling means couples rotational force from the drive shaft to the divert gate to shift the downstream end of the divert gate from the lower position to the upper position.

The friction clutch may include a collar fixed to the drive shaft to rotate with the drive shaft, a first bushing slidably confronting the collar, a second bushing, and a coil spring between the first and second bushings for biasing the first bushing into contact with the collar.

According to another aspect of the invention, a method includes driving a drive belt in a forward direction by rotational motion of a drive shaft in a first rotational direction, with the drive belt driving at least one sheet in a downstream direction. The method further includes driving the drive belt in a reverse direction by rotational motion of the drive shaft in a second rotational direction, where the reverse direction is opposite to the forward direction, and the second rotational direction is opposite to the first rotational direction. The drive belt drives the at least one sheet in an upstream direction while the drive belt is driven in the reverse direction. The method further includes coupling the drive shaft to a divert gate to shift the divert gate from a closed position to an open position in response to the drive shaft rotating in the second rotational direction, and downwardly diverting the at least one sheet by driving the at least one sheet by the drive belt into contact with the divert gate when the divert gate is in the open position.

The coupling step may include engaging the drive shaft with a friction clutch that is connected to the divert gate. The method may further include coupling the drive shaft to the divert gate to shift the divert gate from the open position to the closed position in response to the drive shaft rotating in the first rotational direction.

According to still another aspect of the invention, an improvement is provided in an inserter system. The inserter system includes a sheet transport mechanism, a sheet accumulator that includes (a) a drive belt for receiving paper sheets from the sheet transport mechanism and for driving the paper sheets and (b) a drive shaft for driving the drive belt. The inserter system further includes a divert gate for diverting downwardly paper sheets driven in an upstream direction by the drive belt. The improvement includes a coupling mechanism for converting rotational force of the drive shaft into pivotal force for pivoting the divert gate between a closed position and an open position.

In accordance with these aspects of the invention, the divert gate is actuated in response to forward or reverse rotation of the accumulator belt drive shaft, thereby closely and reliably coordinating positioning of the divert gate with operation of the accumulator drive belt.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

In accordance with aspects of the present invention, a divert gate positioned just upstream from a pre-fold accumulator in an inserter system is actuated for movement between open and closed positions via a linkage coupled to the drive shaft for the sheet drive belt(s) of the accumulator. When the drive shaft rotates in a direction for causing the drive belt to drive sheets in the downstream direction, the linkage converts shaft rotation into an actuation force to move the divert gate to its closed direction. When the drive shaft rotates in a direction for causing the drive belt to drive sheets in the upstream direction, the linkage converts shaft rotation into actuation force to move the divert gate to its open position for downwardly diverting the upstream driven sheets.

Figure 1:
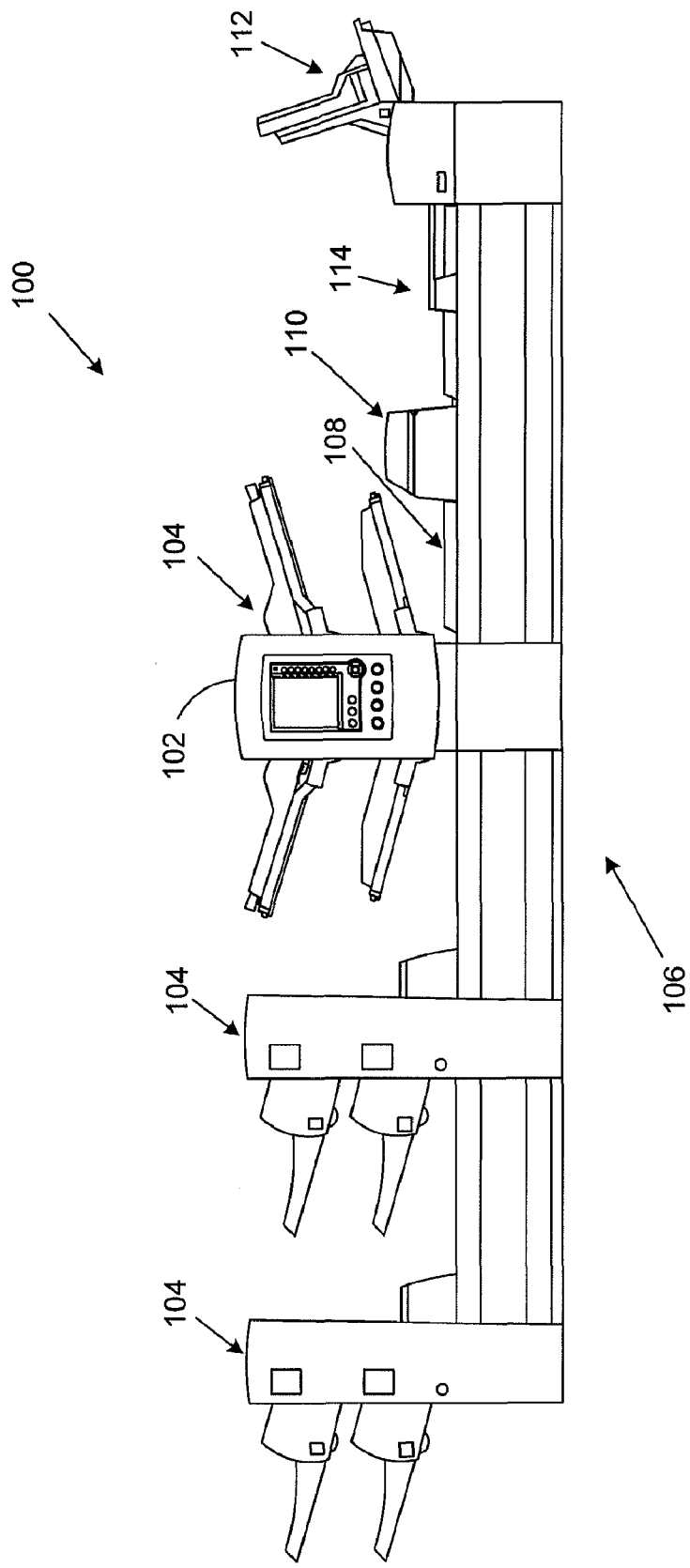
FIG. 1 is a front elevational view of an inserter system in which the present invention may be applied.
Figure 2A:
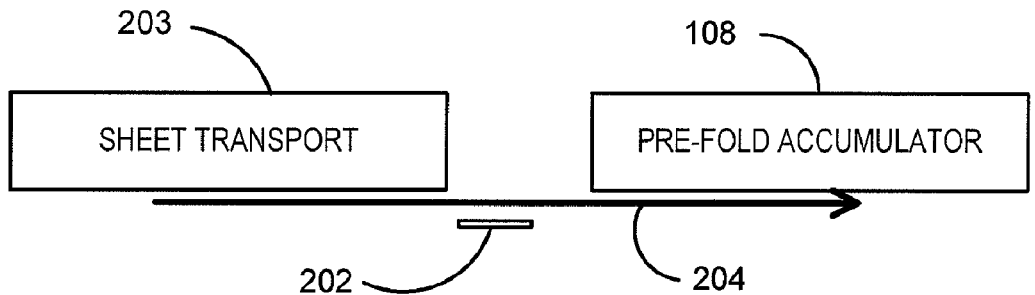
FIGS. 2A and 2B schematically illustrate operation of a divert gate that is a component of the inserter system of FIG. 1.
Figure 2B:
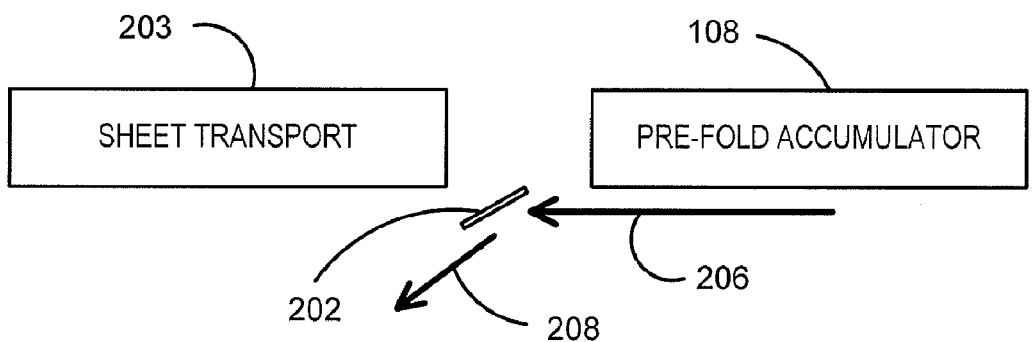
Figure 3A:
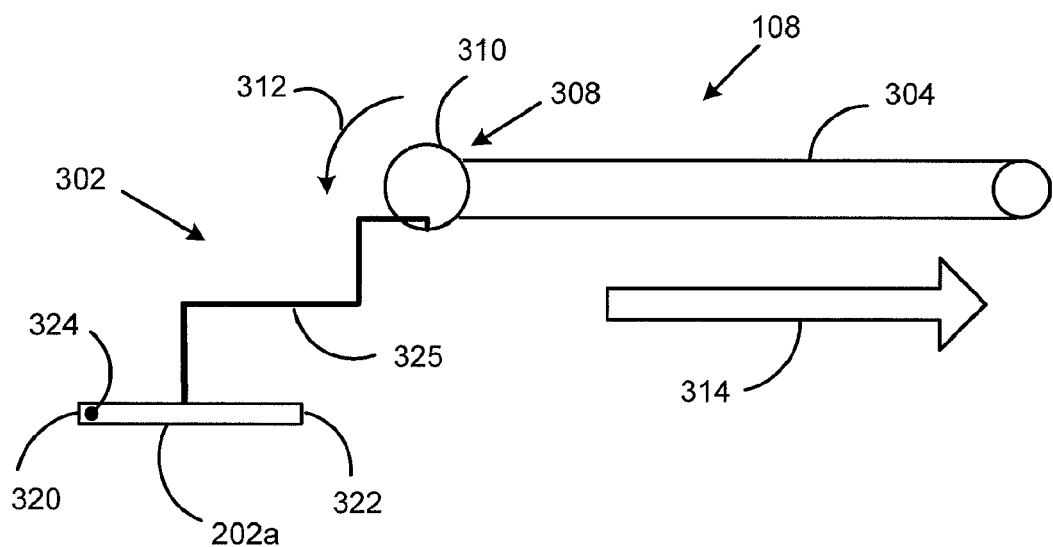
FIGS. 3A and 3B schematically illustrate an arrangement, provided in accordance with aspects of the present invention, by which the divert gate shown in FIGS. 2A and 2B is actuated in response to operation of an accumulator belt drive shaft that is part of the pre-fold accumulator subsystem of the inserter system of FIG. 1.
Figure 3B:
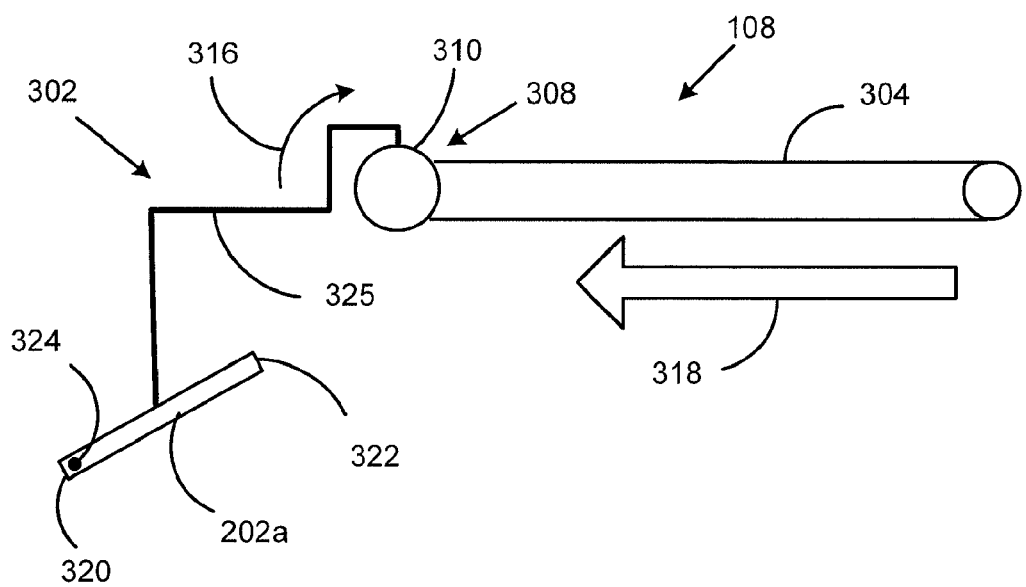
Figure 4:
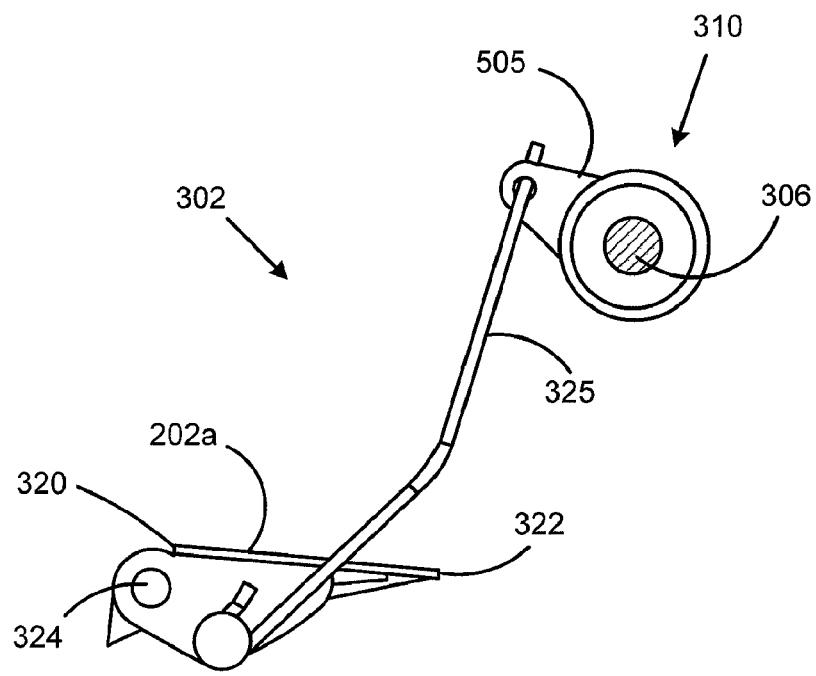
FIG. 4 shows details of the actuating mechanism that couples the accumulator belt drive shaft to the divert gate.

FIGS. 3A and 3B schematically illustrate an arrangement, provided in accordance with aspects of the present invention, by which the divert gate (reference numeral 202a in FIGS. 3A and 3B) is actuated in response to operation of an accumulator belt drive shaft that is part of the pre-fold accumulator subsystem 108 of the inserter system. FIG. 4 shows details of the actuating mechanism 302 that couples the accumulator belt drive shaft to the divert gate in accordance with aspects of the present invention. The features shown in FIGS. 3A, 3B and 4 may be incorporated into the inserter system environment described above with reference to FIGS. 1, 2A and 2B. Except for the manner in which it is controlled, the divert gate 202a of FIGS. 3A, 3B and 4 may be the same, and provide the same functionality, as the divert gate shown in FIGS. 2A and 2B. Moreover, apart from the coupling to the divert gate 202a, as described herein, the pre-fold accumulator 108 may be substantially conventional in its structure and functioning. (A more detailed example of an inserter system in which the invention may be applied is described in U.S. Pat. No. 7,427,059, which is incorporated herein by reference. Moreover, other example inserter systems in which the invention may be applied are commercially available from Pitney Bowes Inc., the assignee hereof, as the DI900/DI950 series.)

In particular, the pre-fold accumulator 108 (also referred to as a sheet accumulator subsystem) may be located downstream from the sheet transport mechanism 203 (FIGS. 2A, 2B) and may receive and accumulate sheets transported toward the pre-fold accumulator 108 by the sheet transport mechanism 203. The pre-fold accumulator 108 includes one or more drive belts, schematically illustrated at 304 in FIGS. 3A and 3B. The drive belt 304 is for driving sheets received by the pre-fold accumulator 108 from the sheet transport mechanism 203. The drive belt 304, in turn is driven by a drive shaft 306 (FIG. 4) which is engaged with the drive belt 304 at an upstream end 308 (FIG. 3A) of the drive belt 304. (In FIGS. 3A, 3B, the drive shaft is obscured from view by the friction clutch 310, which rides on the drive shaft 306 and which is described below.) When the drive shaft rotates in the rotational direction indicated at 312 in FIG. 3A, the drive belt 304 is driven in a forward direction (arrow 314) to drive a sheet or sheets in the downstream direction of the inserter system 100. When the drive shaft rotates in the rotational direction indicated at 316 in FIG. 3B, the drive belt is driven in a reverse direction (arrow 318) to drive a sheet or sheets in the upstream direction of the inserter system 100. It will be noted that the reverse direction 318 of the drive belt 304 is opposite to the forward direction 314 of the drive belt 304, and the rotational direction 316 of the drive shaft 306 is opposite to the rotational direction 312 of the drive shaft 306.

The pre-fold accumulator 108 may also include idler rollers, etc. The drive shaft may be driven by a conventional motor, which is not shown. The motor may be controlled by a conventional control circuit, also not shown.

Noting again that the divert gate 202a itself is substantially conventional, and referring to FIGS. 3A, 3B and 4, the divert gate 202a includes an upstream end 320 and a downstream end 322. The upstream end 320 of the divert gate 202a is pivotally mounted, via a pivot 324 to the frame (not shown) of the inserter system 100 or to other mechanical ground. The downstream end 322 of the divert gate 202a is movable (by pivoting of the divert gate 202a) between an upper position (FIG. 3B) and a lower position (FIG. 3A). The upper position of the downstream end 322 of the divert gate 202a corresponds to the open position of the divert gate 202a; the lower position of the downstream end 322 of the divert gate 202a corresponds to the closed position of the divert gate 202a. The upper and lower positions of the downstream end 322 of the divert gate 202a may be defined by respective stops (not shown) which limit the upward and downward motion of the downstream end 322 of the divert gate 202a. Relative to the reverse feed path of the pre-fold accumulator 108, as illustrated in FIG. 2B, the divert gate 202a may be located (when in the open position) in the same manner as the divert gate 202 shown in FIG. 2B.

In addition to the sheet transport mechanism 203, the pre-fold accumulator 108 and the divert gate 202a, the inserter system 100 also includes the above-mentioned actuating mechanism 302, which is provided in accordance with aspects of the present invention. A function of the actuating mechanism 302 is to couple the divert gate 202a to the drive shaft 306 so that force from the drive shaft 306 is imparted to the divert gate 202a to shift the downstream end 322 of the divert gate 202a between the positions shown respectively in FIGS. 3A and 3B. The actuating mechanism 302 includes the above-mentioned friction clutch 310, and a linkage 325 that is connected both to the divert gate 202a and to the friction clutch 310.

Figure 5:
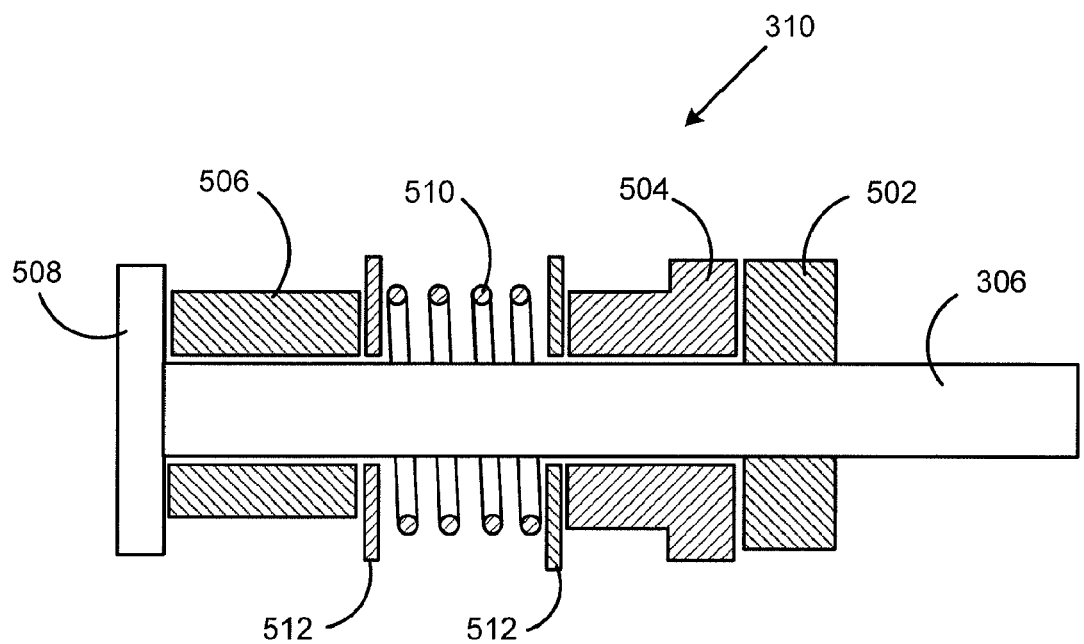
FIG. 5 is a sectional view that schematically illustrates details of a friction clutch that is part of the actuating mechanism shown in FIG. 4.

FIG. 5 is a sectional view that schematically illustrates details of the friction clutch 310. As before, reference numeral 306 indicates the drive shaft. The friction clutch 310 includes a generally cylindrical collar 502 which is fixed to the drive shaft 306 for rotation with the drive shaft. The friction clutch 310 further includes a bushing 504 which rides on the drive shaft 306 in such a manner as to be slidable on the drive shaft 306. The bushing 504 is adjacent to and confronts the collar 502. The bushing 504 is flanged at 505 (FIG. 4) to allow the linkage 324 to be connected to the bushing 504.

Still further, and continuing to refer to FIG. 5, the friction clutch 310 includes a bushing 506 which is adjacent to a portion 508 of the frame of the inserter system. The bushing 506 also rides on the drive shaft 306. It will be appreciated that the drive shaft 306 may be mounted in the frame, which serves as mechanical ground for the friction clutch 310. Alternatively, mechanical ground for the friction clutch 310 may be provided by the inner race of a ball bearing for mounting the drive shaft 306. The ball bearing race enclosure may alternatively be considered to be represented by component 508 in FIG. 5.

In addition, the friction clutch 310 includes a coil spring 510, which rides on the drive shaft 306 between the bushings 504, 506. The spacing of the bushings 504 and 506 and the dimensions of the coil spring 510 are such that the coil spring 510 is held in compression and therefore exerts a biasing force on the bushing 504 to bias the bushing 504 into frictional contact with the collar 502. Steel washers 512 may be provided to interface the coil spring 510 to the bushings 504, 506.

It may be the case that the pre-fold accumulator is unchanged from a conventional design except perhaps for a small increase in the torque provided by the accumulator belt drive shaft.

In operation, the rotational direction of the drive shaft 306 controls the position of the divert gate 202a via the actuating mechanism 302. Let it first be assumed that the divert gate 202a is in the open position (FIGS. 3B, 2B) and that the next step to be performed is feeding of a sheet from the sheet transport mechanism 203 into the pre-fold accumulator 108. To receive the sheet and feed it to the above-mentioned accumulator gate (not shown), the drive shaft 306 is rotated in the direction 312 shown in FIG. 3A, to drive the drive belt 304 in the forward direction 314. Because of frictional engagement between the collar 502 and the flange bushing 504, flange bushing 504 rotates together with the drive shaft 306 and the collar 502. The linkage 325 (FIGS. 3A, 4) translates the rotational motion of the drive shaft 306, the collar 502 and the flange bushing 504 into pivotal motion to pivot the divert gate 202a from its open position shown in FIG. 3B to its closed position shown in FIG. 3A. The response time of the divert gate 202a relative to the beginning of rotation of the drive shaft 306 may be quite rapid, on the order of 15 milliseconds.

The feed path 204 shown in FIG. 2A is now clear to allow transport of the incoming sheet from the sheet transport mechanism 203 into the pre-fold accumulator 108. The drive shaft 306 continues to turn, continuing to drive the drive belt 304 in the forward direction to drive the sheet to the accumulator gate (not shown). The pivoting motion of the divert gate 202a is stopped at the closed position, and thus the flanged bushing 504 is prevented by the linkage 325 (FIG. 4) from rotating with the drive shaft 306/collar 502, and the flanged bushing therefore slips on the drive shaft 306, while remaining in slipping contact with the collar 502.

Next let it be assumed that a collation of sheets (not shown) held in the pre-fold accumulator 108 is to be outsorted via the path shown in FIG. 2B. It is assumed that the divert gate 202a is in the closed position shown in FIG. 3A. The drive shaft 306 is rotated in the direction 316 shown in FIG. 3B, to drive the drive belt 304 in the reverse direction 318. The frictional engagement between the collar 502 and the flange bushing 504 causes the flange bushing 504 to rotate with the drive shaft 306 and the collar 502. The linkage 325 translates the rotation motion of the drive shaft 306, the collar 502 and the flange bushing 504 into pivotal motion to pivot the divert gate 202a from its closed position shown in FIG. 3A to its open position shown in FIG. 3B. The response time of the divert gate 202a is rapid enough to open the divert gate 202a before the reverse-driven collation reaches the divert gate 202a. The collation is driven into the divert gate 202a by the drive belt 304 and diverted downwardly by the divert gate 202a, as illustrated in FIG. 2B. The drive shaft 306 continues to turn with the divert gate 202a in the open position as the reverse driving of the collation is completed. While this takes place, the pivoting motion of the divert gate 202a is stopped at the open position, such that the linkage 325 prevents the flanged bushing 504 from rotating with the drive shaft 306/collar 502. Again the flanged bushing 504 slips relative to the drive shaft 306 and the collar 502.

With the divert gate actuating mechanism described above with reference to FIGS. 3A-5, the short-comings of a spring-loaded divert gate may be avoided, and reliable operation of the divert gate achieved, at low cost.

In addition or as an alternative to the function of the divert gate in regard to outsorting reverse-fed over-sized collations, the divert gate may perform a function relative to preventing or minimizing jamming of sheets upon entry into the pre-fold accumulator 108. According to this function, before an additional sheet is fed into the pre-fold accumulator 108, one or more sheets already present in the pre-fold accumulator 108 are driven a short distance upstream by the drive belt, and the upstream (relative to normal feed direction) edge of the reverse driven sheets is slightly downwardly diverted by the divert gate 202a (which is opened to a limited extent) to allow the new sheet to be fed into the pre-fold accumulator 108 while clearing the upstream edge of the sheets already in the pre-fold accumulator 108.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. An inserter system comprising:

sheet transport means for transporting a sequence of sheets in a downstream direction;

a sheet accumulator subsystem, located in the downstream direction from the sheet transport means, for receiving and accumulating the sheets transported by the sheet transport means; the sheet accumulator subsystem including a drive belt and a drive shaft engaged with the drive belt at an upstream end of the drive belt, the drive shaft selectively driving the drive belt in a forward direction and a reverse direction, the drive belt for driving one or more of said sheets in said downstream direction when the drive belt is driven in said forward direction by the drive shaft, the drive belt for driving one or more of said sheets in an upstream direction when the drive belt is driven in said reverse direction, said upstream direction opposite to said downstream direction;

a divert gate located in said upstream direction relative to the drive belt, the divert gate pivotally mounted at an upstream end thereof, the divert gate having a downstream end that is movable between an upper position and a lower position, the divert gate located relative to the drive belt such that the divert gate downwardly diverts one or more of said sheets when the downstream end of the divert gate is in the upper position and the drive belt is driven in the reverse direction; and coupling means for coupling the divert gate to the drive shaft to impart force from the drive shaft to the divert gate for pivotally moving the divert gate to shift the downstream end of the divert gate between the lower position and the upper position, the coupling means including a linkage connected to the divert gate and a friction clutch disposed between and connecting the drive shaft to the linkage, the friction clutch including: a collar affixed to and rotating with the drive shaft; a first bushing adjacent to and coaxially aligned with the collar, a second bushing proximal to an end of the drive shaft and coaxially aligned with the first bushing, and a coil spring interposing and abutting the first and the second bushings, the first bushing frictionally engaging the collar along a surface perpendicular to the rotational axis of the drive shaft and including a flange projecting radially therefrom for connecting the bushing to the linkage, the second bushing axially restrained relative to the rotational axis of the drive shaft, and the coil spring operative to bias the first bushing into frictional engagement with the collar.

2. The inserter system according to claim 1, wherein:

the drive shaft rotates in a first rotational direction to drive the drive belt in the forward direction;

the drive shaft rotates in a second rotational direction to drive the drive belt in the reverse direction, the second rotational direction opposite to the first rotational direction;

the coupling means couples rotational force from the drive shaft rotating in the first rotational direction to the divert gate to shift the downstream end of the divert gate from the upper position to the lower position; and the coupling means couples rotational force from the drive shaft rotating in the second rotational direction to the divert gate to shift the downstream end of the divert gate from the lower position to the upper position.

3. A method comprising:

driving a drive belt in a forward direction by rotational motion of a drive shaft in a first rotational direction, the drive belt driving at least one sheet in a downstream direction;

driving the drive belt in a reverse direction by rotational motion of the drive shaft in a second rotational direction, the reverse direction opposite to the forward direction, the second rotational direction opposite to the first rotational direction, the drive belt driving the at least one sheet in an upstream direction while the drive belt is driven in the reverse direction;

coupling the drive shaft to a divert gate to shift the divert gate from a closed position to an open position in response to the drive shaft rotating in the second rotational direction; the step of coupling the shaft to the divert gate including the step of providing a friction clutch disposed between and connecting the drive shaft to a linkage, the friction clutch including: a collar affixed to and rotating with the drive shaft; a first bushing adjacent to and coaxially aligned with the collar, a second bushing proximal to an end of the drive shaft and coaxially aligned with the first bushing, and a coil spring interposing and abutting the first and the second bushings, the first bushing frictionally engaging the collar along a surface perpendicular to the rotational axis of the drive shaft and including a flange projecting radially therefrom for connecting the bushing to the linkage, the second bushing axially restrained relative to the rotational axis of the drive shaft, and the coil spring operative to bias the first bushing into frictional engagement with the collar, and downwardly diverting the at least one sheet by driving the at least one sheet by the drive belt into contact with the divert gate when the divert gate is in the open position.

4. The method according to claim 3, further comprising:
coupling the drive shaft to the divert gate to shift the divert gate from the open position to the closed position in response to the drive shaft rotating in the first rotational direction.

5. In an inserter system which includes (a) sheet transport means, (b) a sheet accumulator subsystem including (i) a drive belt for receiving paper sheets from the sheet transport means and for driving the paper sheets and (ii) a drive shaft for driving the drive belt, and (c) a divert gate for diverting downwardly paper sheets driven in an upstream direction by the drive belt, the improvement comprising:
coupling means for translating rotational force of the drive shaft into pivotal force for pivoting the divert gate between a closed position and an open position, the coupling means including a linkage connected to the divert gate and a friction clutch disposed between and connecting the drive shaft to the linkage, the friction clutch including: a collar affixed to and rotating with the drive shaft; a first bushing adjacent to and coaxially aligned with the collar, a second bushing proximal to an end of the drive shaft and coaxially aligned with the first bushing, and a coil spring interposing and abutting the first and the second bushings, the first bushing frictionally engaging the collar along a surface perpendicular to the rotational axis of the drive shaft and including a flange projecting radially therefrom for connecting the bushing to the linkage, the second bushing axially restrained relative to the rotational axis of the drive shaft, and the coil spring operative to bias the first bushing into frictional engagement with the collar.

* * * * *